(12) United States Patent
Frazier

(10) Patent No.: US 6,691,951 B2
(45) Date of Patent: Feb. 17, 2004

(54) VARIABLE LOAD ASSIST MECHANISM FOR AN OVERHEAD BIN

(75) Inventor: Joe Frazier, Bellingham, WA (US)

(73) Assignee: Britax Heath Tecna Inc., Bellingham, WA (US)

( * ) Notice: Subject to any disclaimer, the term of this patent is extended or adjusted under 35 U.S.C. 154(b) by 0 days.

(21) Appl. No.: 10/281,453

(22) Filed: Oct. 25, 2002

(65) Prior Publication Data
US 2003/0080247 A1 May 1, 2003

Related U.S. Application Data
(60) Provisional application No. 60/347,582, filed on Oct. 26, 2001.

(51) Int. Cl.[7] .............................................. B64D 11/00
(52) U.S. Cl. ..................................... 244/118.1; 312/347
(58) Field of Search ........................... 244/118.1, 118.5; 312/247, 248

(56) References Cited
U.S. PATENT DOCUMENTS

| 4,275,942 A | | 6/1981 | Steidl ..................... 312/247 X |
| 5,244,269 A | | 9/1993 | Harriehausen et al. ...... 312/247 |
| 5,383,628 A | * | 1/1995 | Harriehausen et al. ... 244/118.1 |
| 5,441,218 A | * | 8/1995 | Mueller et al. .......... 244/118.1 |
| 5,456,529 A | | 10/1995 | Cheung ..................... 312/245 |
| 5,839,694 A | * | 11/1998 | Bargull et al. ........... 244/118.1 |
| 5,934,615 A | * | 8/1999 | Treichler et al. ......... 244/118.5 |
| 6,045,204 A | * | 4/2000 | Frazier et al. ............. 312/247 |
| 6,484,969 B2 | * | 11/2002 | Sprenger et al. ......... 244/118.5 |

FOREIGN PATENT DOCUMENTS

DE  44 46 772 C1  5/1996

* cited by examiner

Primary Examiner—Robert P. Swiatek
(74) Attorney, Agent, or Firm—Christensen O'Connor Johnson Kindness PLLC

(57) ABSTRACT

A luggage bin assembly adapted to be disposed within a vehicle. The luggage bin assembly includes a bin (203) reciprocally mounted for movement between an opened position and a closed position. The luggage bin assembly also includes a linkage assembly (232) adapted to be hingedly mounted to the bin for swinging movement with the bin as the bin is reciprocated between the open and closed positions. A reciprocating assist mechanism (216) is coupled to the linkage mechanism to selectively apply an assist load to the linkage assembly when the bin is reciprocated between the opened and closed positions.

10 Claims, 13 Drawing Sheets

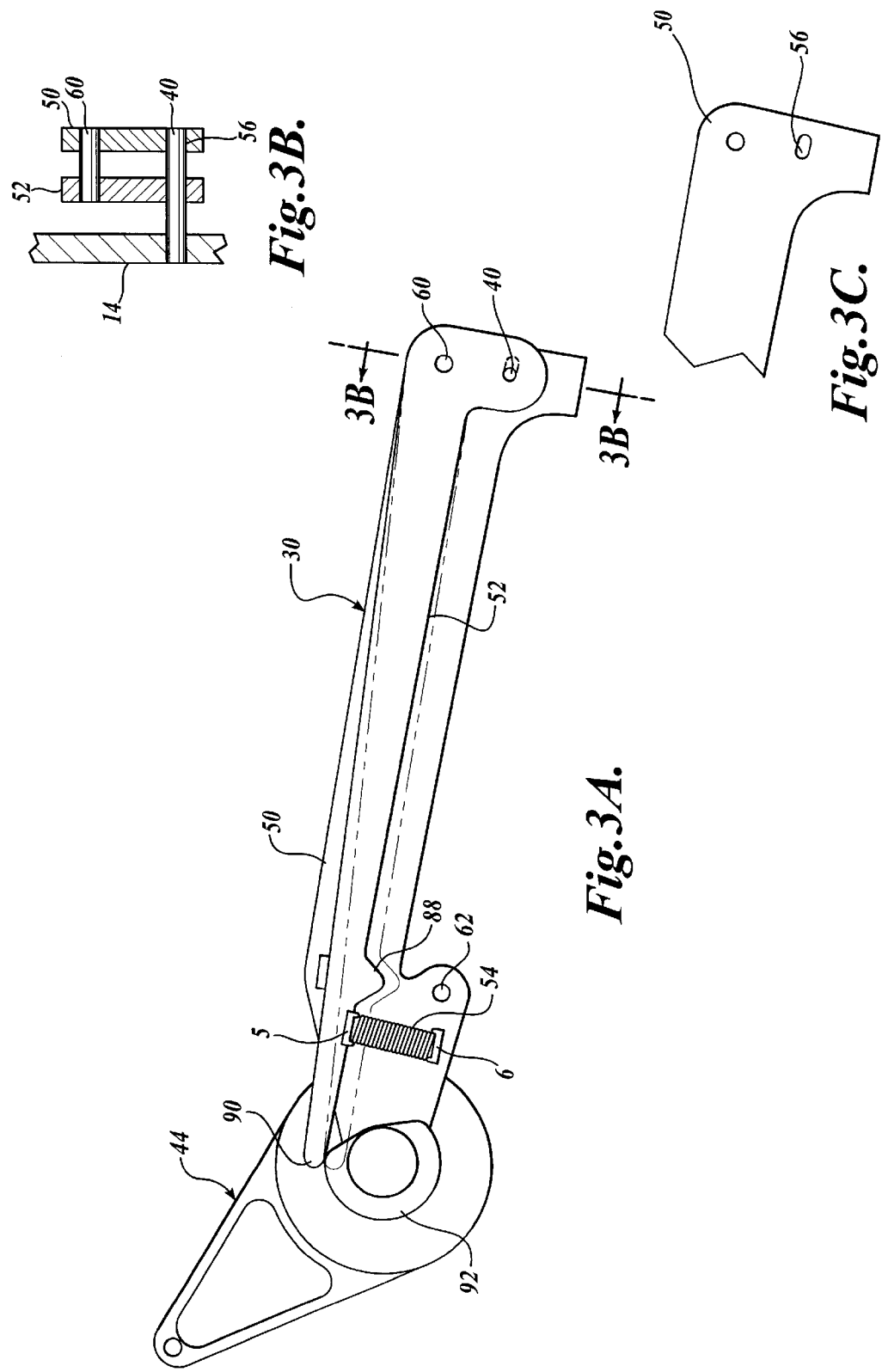

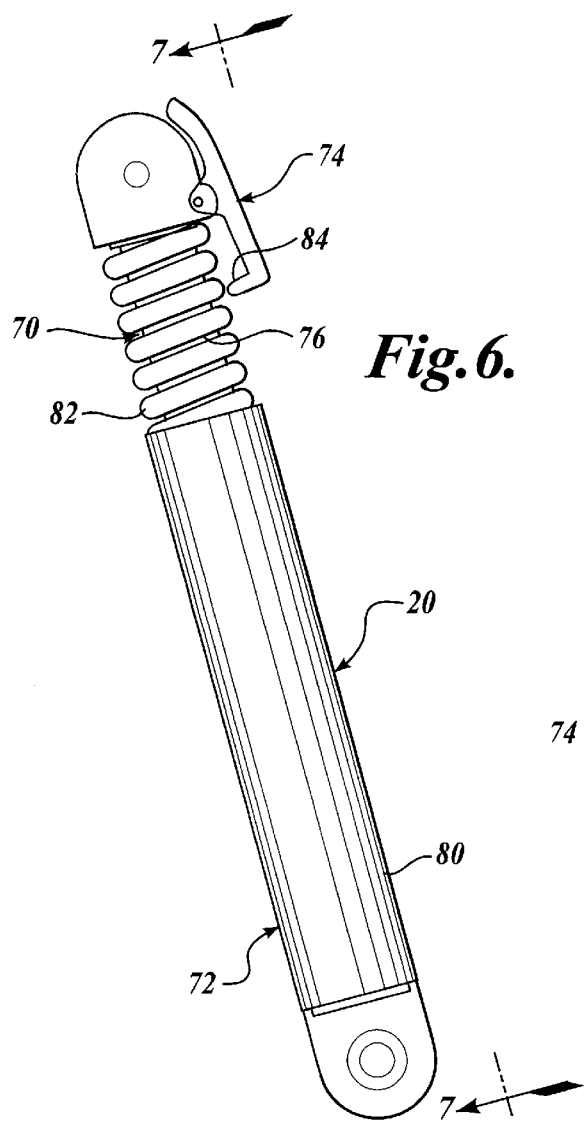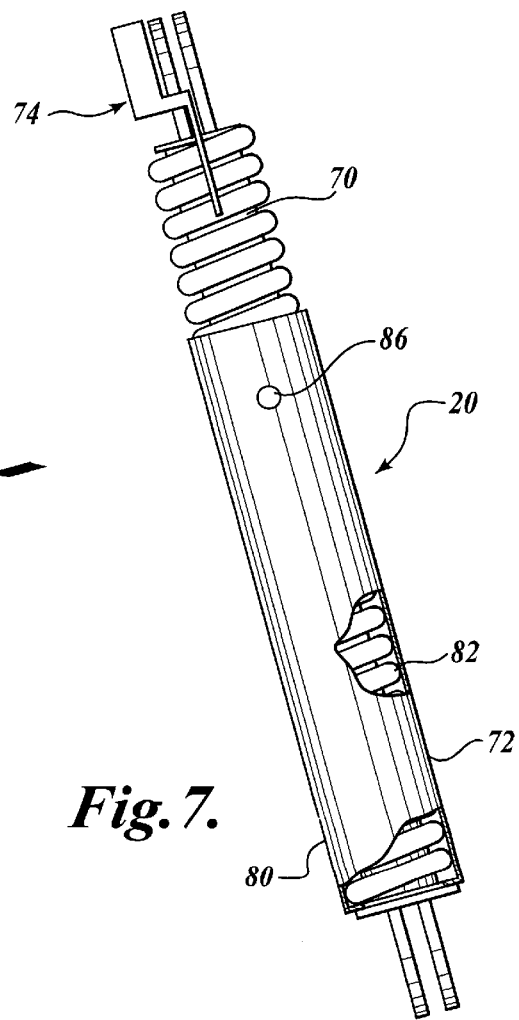

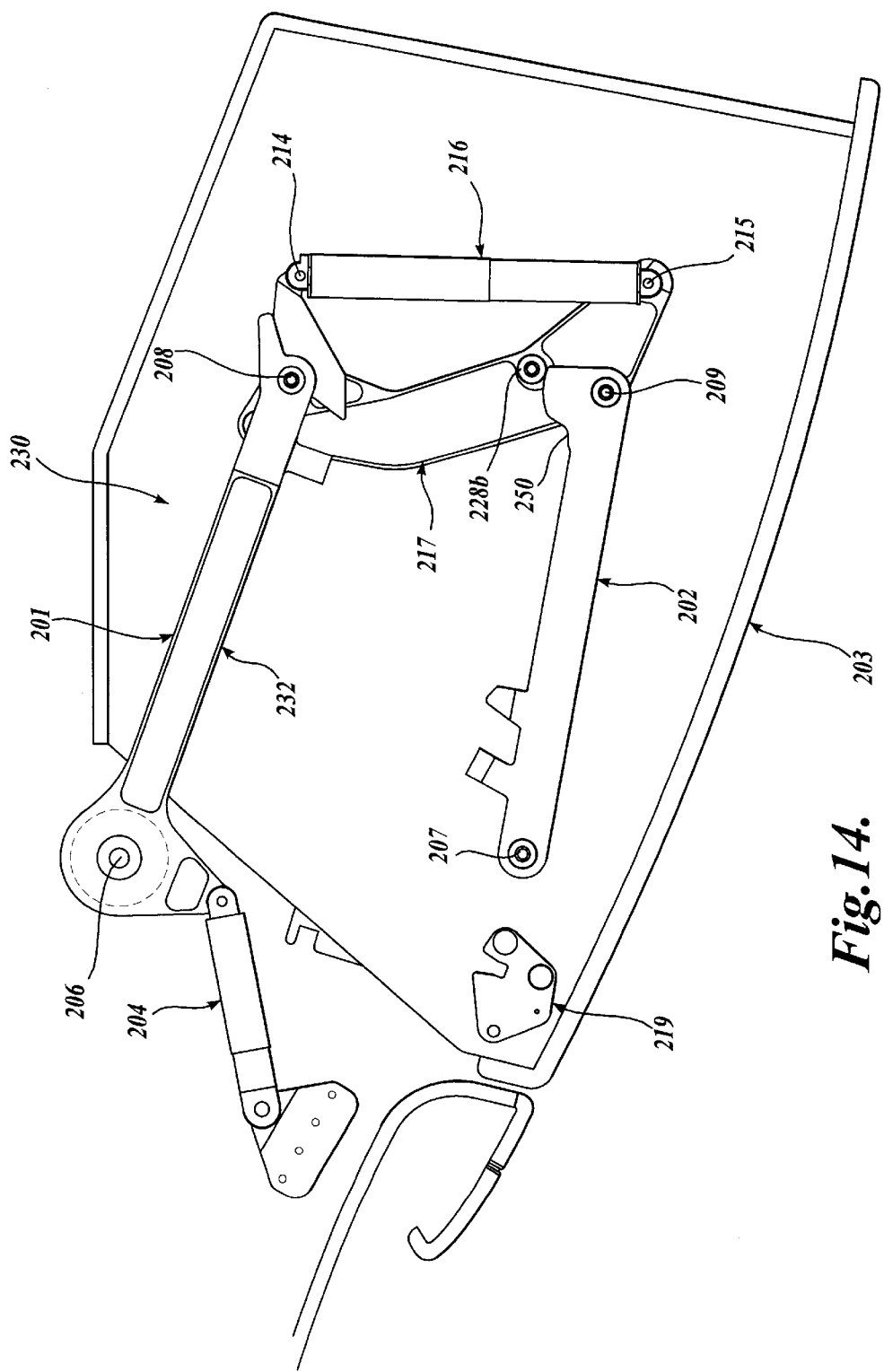

VARIABLE LOAD ASSIST MECHANISM FOR AN OVERHEAD BIN

CROSS-REFERENCE TO RELATED APPLICATION

In accordance with 35 U.S.C. §119(e), this application claims the benefit of U.S. Provisional Patent Application Serial No. 60/347,582, filed Oct. 26, 2001, the disclosure of which is hereby expressly incorporated by reference.

FIELD OF THE INVENTION

This invention relates generally to actuators for vehicle stowage bins and, more particularly, to spring assist actuators.

BACKGROUND OF THE INVENTION

Pull-down bucket stowage bins are commonly used to stow luggage in vehicles having a passenger compartment, such as buses and commercial aircraft. Typically, such stowage bins are reciprocally mounted to or near the ceiling of the passenger compartment, such that they are located above rows of passenger seats within the vehicle. As mounted, the bins may be reciprocated between an open position, where items may be placed within the bin, and a closed positioned to stow items located within the bin. Although overhead stowage bins are effective at stowing items, such as luggage, they are not without their problems.

As an example, a loaded overhead luggage bin of an aircraft may be difficult to push upward into the stowed position due to the weight of the luggage within the bin. This is especially true as it is becoming more common for passengers to carry on heavier luggage. Further, regardless of the weight within the bin, it is desirable to provide such bins with a mechanism that assists in raising the overhead bin into the stowed position.

Therefore, there exists a need for a mechanical actuator for an overhead stowage bin, in which the actuator assists in reciprocating a heavily loaded overhead bin into the closed position, thereby reducing the load required by a passenger to raise the overhead bin into the closed position. Also, this mechanical load-assist actuator must not be activated when the bin is operated in an empty or lightly loaded condition.

SUMMARY OF THE INVENTION

In accordance with one embodiment of the present invention, a luggage bin assembly is provided. The luggage bin assembly generally includes a bin and a linkage assembly. The bin is reciprocally mounted for movement between extended and retracted positions, and the linkage assembly is hingedly mounted to the bin for swinging movement with the bin as the bin is reciprocated between the extended and retracted positions. The luggage bin assembly also includes an actuator coupled to the linkage assembly to selectively apply an assist load to the linkage mechanism when weight disposed within the bin exceeds a predetermined limit.

In accordance with certain aspects of one embodiment of the present invention, the actuator is displaced into a locked position when the weight disposed within the bin is below the predetermined limit. The actuator may also continually apply the assist load as the bin is reciprocated between the extended and retracted positions to reduce the load required to reciprocate the bin.

In accordance with other aspects of one embodiment of the present invention, the linkage assembly includes an upper and lower arm assembly, wherein the actuator extends between the upper and lower arm assemblies. In certain other embodiments, the lower arm includes a cammed surface to assist in maintaining the bin in the extended position during loading and unloading of the bin.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 3A is a side planar view of an upper arm assembly for an overhead bin formed in accordance with one embodiment of the present invention;

FIG. 3B is a cross-sectional end view of the upper arm assembly of FIG. 3A, taken substantially through section 3B—3B of FIG. 3A;

FIG. 3C is a partial side planar view of the upper arm assembly of FIG. 3A with a portion of the upper arm assembly removed for clarity;

FIG. 6 is a side planar view of the actuator of FIG. 4, showing both main and auxiliary spring engagement when a heavy weight is disposed within the overhead stowage bin;

FIG. 7 is a planar view of the actuator of FIG. 6 taken substantially through section 7—7, showing a portion of the actuator housing cut away for clarity;

FIG. 14 is a side planar view of the overhead bin assembly of FIG. 8, showing the overhead bin assembly in the closed position and heavily loaded.

DETAILED DESCRIPTION OF THE PREFERRED EMBODIMENT

Figure 1:
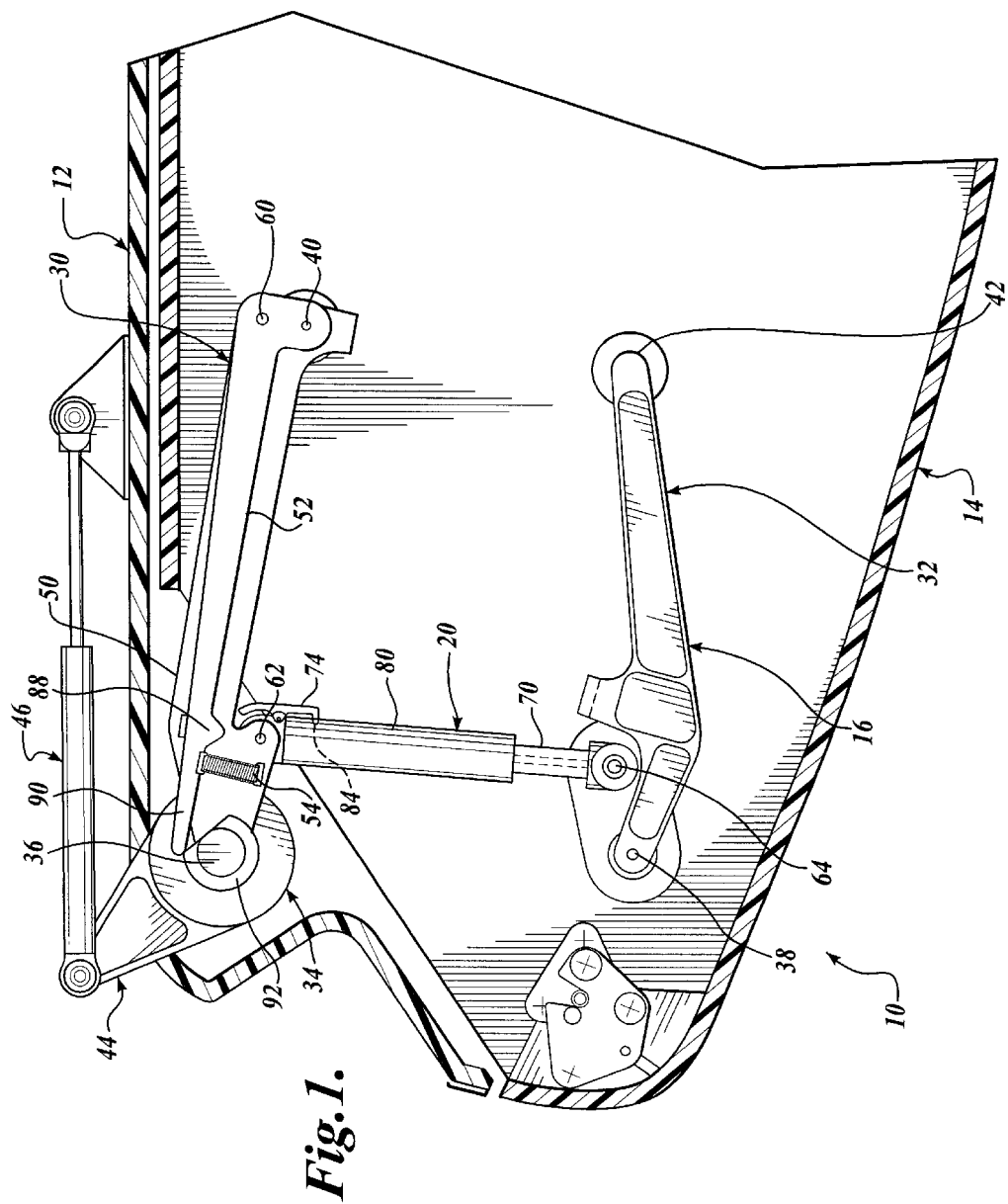
FIG. 1 is a side planar view of an overhead bin having an assist actuator formed in accordance with one embodiment of the present invention, showing the overhead bin in a closed position and lightly loaded.
Figure 2A:
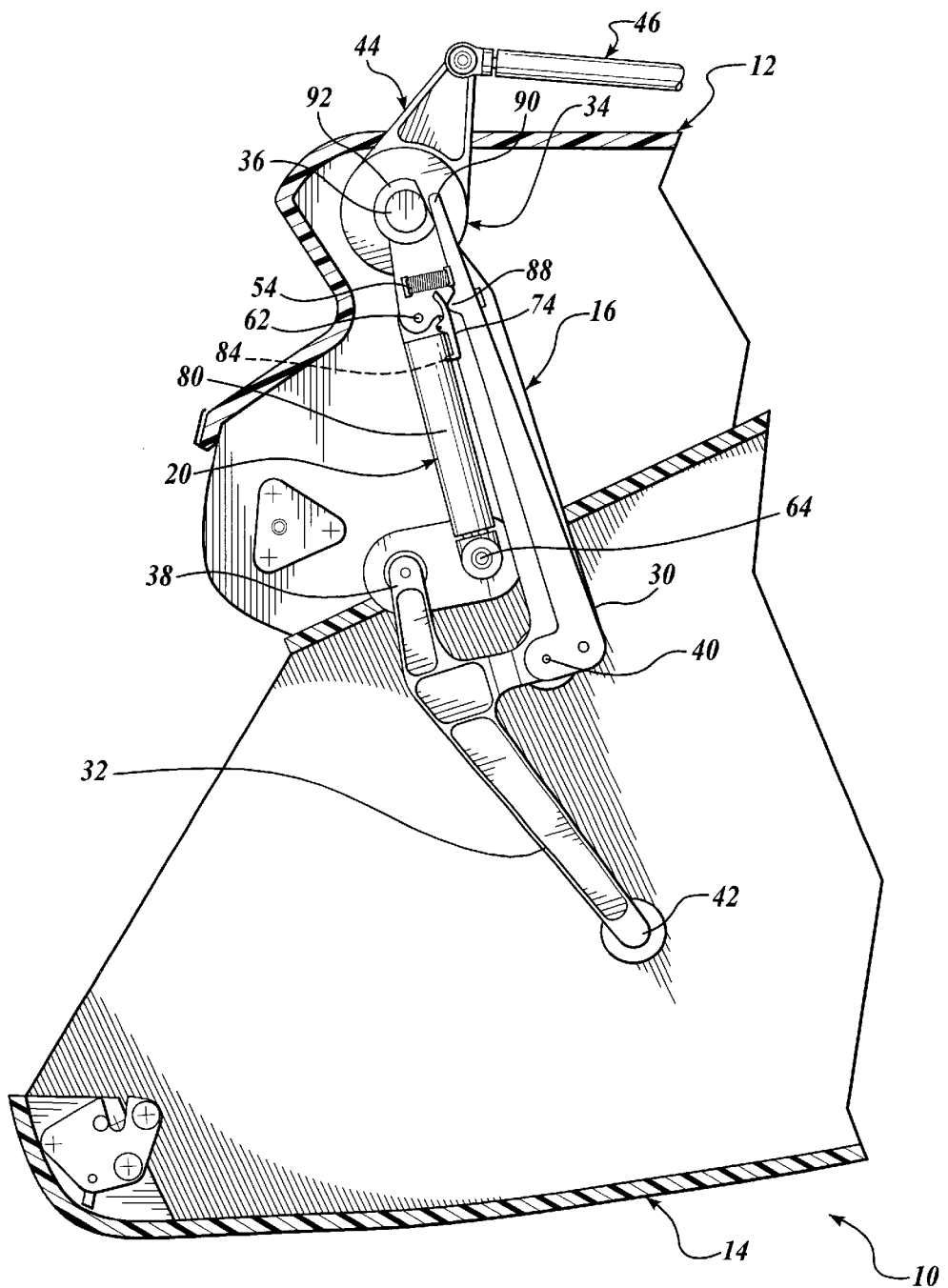
FIG. 2A is a side planar view of the overhead bin assembly of FIG. 1, showing the overhead bin in a fully open position and the bin assembly heavily loaded.
Figure 2B:
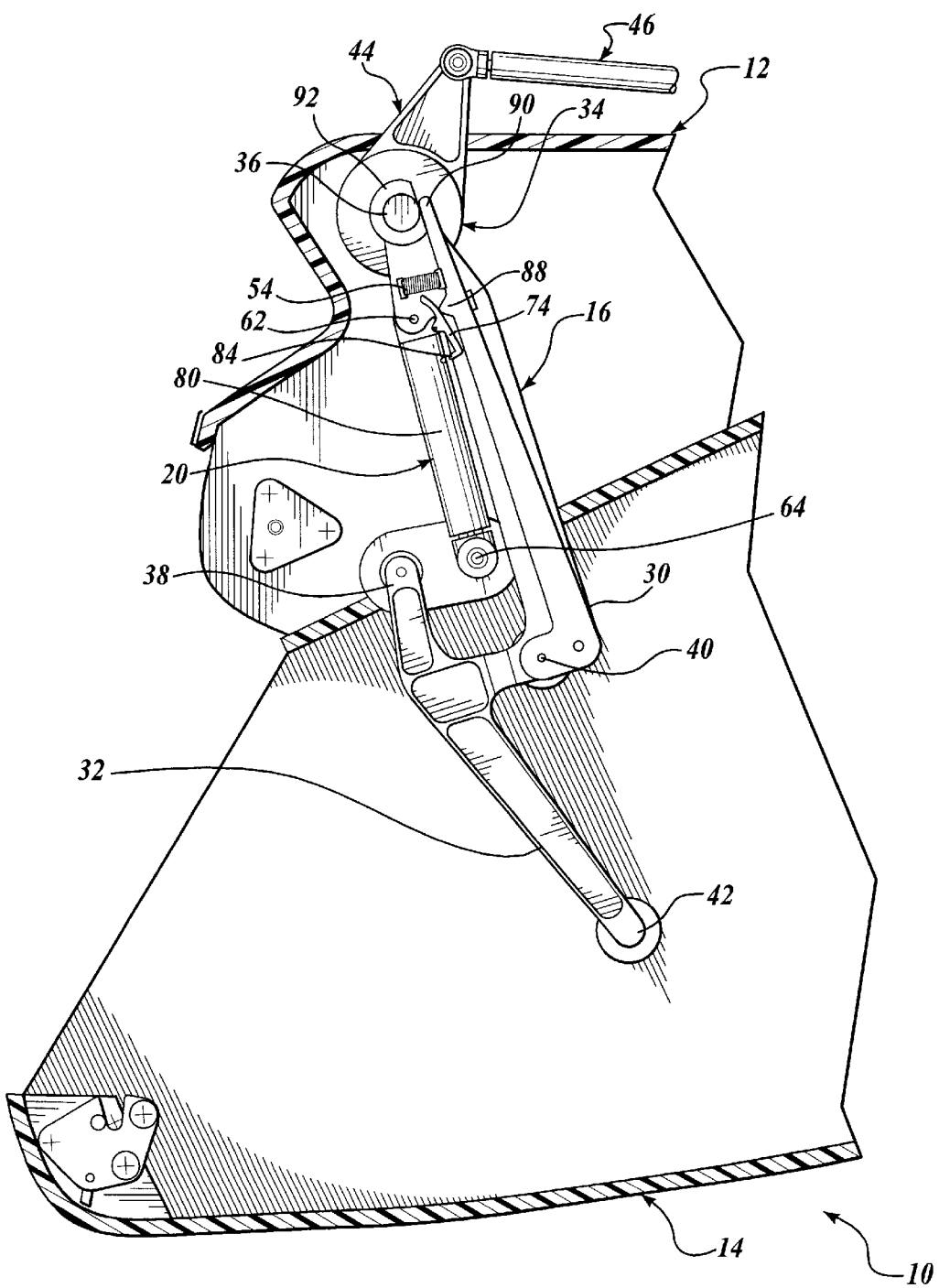
FIG. 2B is a side planar view of the overhead bin assembly of FIG. 1, showing the overhead bin in a partially closed position and the bin assembly heavily loaded.
Figure 4:
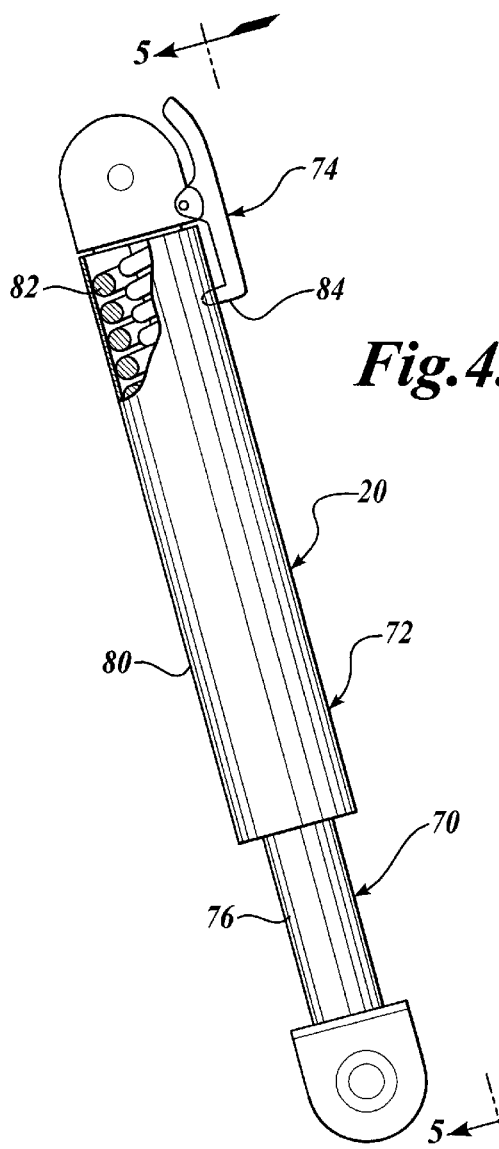
FIG. 4 is a side planar view of an actuator formed in accordance with one embodiment of the present invention, showing the actuator in the overhead bin's closed position and lightly loaded.
Figure 5:
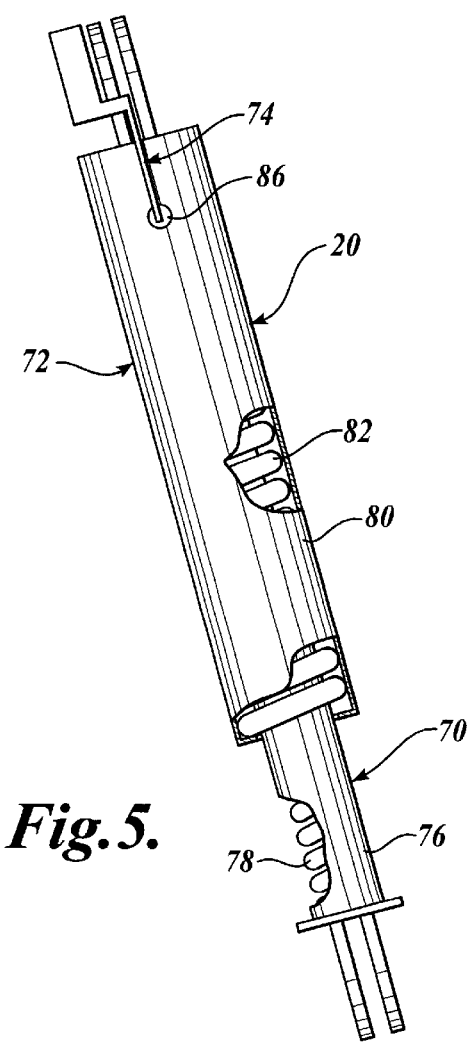
FIG. 5 is a planar view of the actuator of FIG. 4 taken substantially through section 5—5, with a portion of the actuator cut away to show both an auxiliary spring and a main spring.

FIGS. 1–2B illustrate a pull-down stowage bin assembly 10 (hereinafter "bin assembly 10") constructed in accordance with one embodiment of the present invention. The bin assembly 10 includes a housing 12, a bucket assembly 14, linkage assembly 16, and actuator 20. The bucket assembly 14 is connected to the housing 12 by the linkage assembly 16. Although a single linkage assembly 16 is illustrated, it should be apparent that a second, similarly configured linkage assembly (not shown) may be disposed at an opposite end of the bucket assembly 14 to control the operational movement of the bucket assembly 14. Further, either one or both linkage assemblies include an actuator 20, which is pivotally connected to an upper arm assembly 30 by a pivot pin 62 and the housing 12 by a pivot pin 64. For ease of description, only one linkage assembly will be described in greater detail.

The linkage assembly 16 includes the upper arm assembly 30 and a lower arm assembly 32. The upper and lower arm assemblies 30 and 32 are suitably pivotally coupled to the side walls of the bucket assembly 14 by pivot pins 40 and 42, respectively, and in a manner well known in the art. Further, the upper arm assemblies 30, at each end of the bucket assembly 14, may be interconnected by a torque tube assembly 34 to ensure that both upper arm assemblies 30 move together, thereby providing coordinated bucket movement through the opening and closing processes.

The upper and lower arm assemblies 30 and 32 are also suitably pivotally connected to the housing 12 by pivot pins 36 and 38, respectively. The rate of bucket opening is controlled by arm 44 which is pivotally attached to a damper 46 secured to the housing 12. The arm 44 can be directly attached to the end of the upper arm assembly 30 or, if a torque tube 34 is used, the arm 44 could be attached directly to the torque tube in a manner well known in the art.

Referring now to FIGS. 3A–3C, the upper arm assembly 30 will now be described in greater detail. The upper arm assembly 30 includes an upper arm 50, a weighing arm 52 and a weighing spring 54. The upper arm 50 is a substantially C-shaped member that includes a slot 56 (FIG. 3C) extending parallel to the longitudinal direction of the upper arm 50. The slot 56 provides for slight longitudinal movement of the bucket assembly 14 during heavy loading, thereby forcing movement of weighing arm 52.

Movement of the weighing arm 52 is induced when there is a predetermined weight placed in the bin. As seen best by referring to FIG. 3B, the pivot pin 40 is secured to the bucket assembly 14 and the pin 40 protrudes through both the weighing arm 52 and the slot 56 in the upper arm 50. The predetermined weight disposed within the bin causes the pivot pin 40 to move downward in the slot 56, thereby producing a rotational force in the weighing arm 52 which, in turn, activates switch 74 when the bin is in motion, as is described in greater detail below.

The foregoing movement of the weighing arm 52 occurs only after predetermined movement of the bucket assembly 14 toward the closed position. Specifically, when the bucket assembly 14 is in the fully open position, the actuator 20 is not activated. This prevents the actuator 20 from applying an assist load to the bucket assembly 14 if the weight within the bucket assembly 14 is either removed or is below a predetermined limit, thereby minimizing the risk of the actuator 20 applying an unnecessary assist load to a lightly loaded or empty bin. As used within this description, an "assist load" is intended to mean a secondary load provided by the actuator 20 when the bucket assembly 14 is loaded with a weight that exceeds the predetermined weight limit. Such an assist load aids in the closing of the bucket assembly 14 because it provides an additional load that urges a heavily loaded bucket assembly 14 into the closed position. Further, such an assist load aids in opening a heavily loaded bucket assembly 14 because it resists rapid opening of the bucket assembly 14 due to the weight disposed therein.

Thus, an actuator 20 formed in accordance with the present embodiment provides both a primary closing load, where the actuator 20 urges the bucket assembly 20 toward the closed position, regardless of the weight within the bucket assembly 14, and an assist load.

The weighing arm 52 is suitably an L-shaped member and pivots on the upper arm 50 at pivot pin 60. As seen best by referring to FIG. 3A, the weighing arm 52 is pivotable between a loaded position (shown in phantom) and an unloaded position. In the loaded position, the weighing arm 52 contacts a portion of the actuator 20 to apply an assist load to the linkage assembly 16 as the bucket assembly 14 is reciprocated between the open and closed positions, as is described in greater detail below.

The weighing spring 54 extends between a protrusion 5 on the weighing arm 52 and a corresponding lug 6 on the upper arm 50. The weighing spring 54 limits movement of the weighing arm 52 and biases the weighing arm 52 into the unloaded position. As described in detail below, the weighing spring 54 is selectively compressed by the weighing arm 52 to activate a switch 74 when the weight placed in the bin bucket assembly 14 exceeds a predetermined limit.

Referring now to FIGS. 4–7, the actuator 20 will now be described in greater detail. The actuator 20 includes a main spring assembly 70, an auxiliary spring assembly 72, and the switch 74. The main spring assembly 70 includes a spring housing 76 and a coil compression spring 78 disposed within the spring housing 76. The main spring assembly 70 is coaxially received and extends within the auxiliary spring assembly 72. As described above, the main spring assembly 70 provides the primary closing load.

The auxiliary spring assembly 72 selectively provides the assist load and includes a spring housing 80 and a spring 82. The switch 74 is pivotally connected to the actuator 20 and is spring loaded (not shown) toward an actuator-locked position. One end of the switch 74 is angled to form a hook 84. The hook 84 is adapted and positioned to be selectively and releasably received within a bore 86 extending through the spring housing 80, thus, securing the auxiliary spring assembly 72 in a compressed condition. Although the switch 74 is suitably a hook engaging in a bore 86, other types of switches, such as a hook engaging on a recessed circumferential groove or protruding flange on the auxiliary spring assembly 72, are also within the scope of the present invention.

Operation of the actuator 20 may be best understood by referring to FIGS. 1–2B. Actuation of the auxiliary spring assembly 72 is accomplished through the switch 74, which is operated when the bucket assembly 14 is heavily loaded and is moved from the fully opened or closed position. As a nonlimiting example, and best seen in FIG. 2B, the actuator 20 is actuated when the bin has been rotated approximately 10° from the fully open position toward the closed position. Although it is preferred that the actuator 20 assists in both opening and closing of the bucket assembly 14, other types of actuators, such as one that assists only in the closing or opening of the bucket assembly, are also within the scope of the present invention.

As noted above, actuation of the auxiliary spring assembly 72 is triggered when a weight disposed within the bucket assembly 14 exceeds a predetermined weight limit. Within the meaning of this disclosure, a "predetermined weight limit" can vary according to the size and type of bucket assembly. Accordingly, the magnitude of the weight limit will vary and is dependent upon various factors, including the type of vehicle in which the bin assembly is mounted, the type of materials disposed within the bin assembly, and related considerations. As a nonlimiting example, for a bin assembly disposed within the fuselage of an aircraft, the predetermined weight limit that must be exceeded before the actuator 20 is actuated is ten (10) pounds. Although ten (10) pounds is cited as a nonlimiting example, it should be apparent that a lesser or greater weight limit is also within the scope of the present invention.

As the bucket assembly 14 loaded weight is increased, the weighing arm 52 translates within the slot 56 of the upper arm 50. As the weighing arm 52 translates, the weighing spring 54 is compressed until a portion of the weighing arm 52 activates the switch 74. Specifically, the weighing arm 52 includes a cam surface 88 extending from one side of the weighing arm 52. As seen in FIG. 2B, the cam surface 88 depresses the switch 74 when the weight in the bucket assembly 14 exceeds the predetermined weight limit and the bucket assembly 14 is between the fully open and closed positions.

This action causes the switch 74 to pivot, thereby rotating the hook 84 from within the bore 86 of the spring housing 80. As a result, the auxiliary spring assembly 72 applies more closing force when the bucket is displaced towards the closed position and offsets heavy bucket loading weight. Thus, the actuator 20 applies an assist load when the bucket assembly 14 is reciprocated between the open and closed positions.

The switch 74 reengages the bore 86 when the bucket assembly 14 is in the fully opened position (FIG. 2A). As noted above, if the bucket assembly 14 is empty or is lightly loaded, i.e., includes a weight that is below the predetermined weight limit, then the switch 74 remains engaged within the bore 86 when the bucket assembly 14 is returned to the closed position (FIG. 1). If, however, the bucket assembly 14 is heavily loaded, i.e., includes a weight greater than the predetermined weight limit, then the switch 74 is disengaged from within the bore 86 when the bucket assembly 14 is returned to the closed position (FIGS. 6 and 7). As configured, the actuator 20 does not provide an assist load when the bucket assembly 14 is reciprocated between the open and closed positions and the bucket assembly 14 is empty or lightly loaded, but does provide such an assist load when the bucket assembly 14 is heavily loaded.

As shown in FIG. 3A, when the bucket assembly 14 is returned to the fully open position, the weighing arm 52 is returned to the nominal position by one end 90 of the weighing arm 52 riding on a cam surface 92, which is attached to the housing 12. During a subsequent closing of a heavily loaded bucket assembly 14, the auxiliary spring assembly 72 is activated when the end 90 of the weighing arm 52 leaves the cam surface 92, thus providing a mechanical acceleration restraint and ease of opening and closing the bucket assembly 14. Movement of the weighing arm 52 is resisted when the bucket assembly 14 is in the fully opened and closed positions because the end 90 of the weighing arm 52 is resting on the cam 92. The open bucket is retained in the open position by an overcenter location of the actuator 20 and alignment of the pivot pins 36, 62, and 64.

Referring now to FIGS. 8–14, a variable load assist mechanism 230 ("the mechanism 230") formed in accordance with another embodiment of the present invention will now be described in greater detail. The mechanism 230 of this embodiment is substantially similar to the previous embodiments described above. Although there are variations between all of the embodiments, similar aspects of the embodiments will not be repeated. However, it should be apparent that such similar aspects may form a part of the current embodiment of the invention being described and, therefore, are within the scope of the present invention.

The mechanism 230 includes a four-bar linkage assembly 232 located at each end of a bin bucket 203. Each four-bar linkage assembly 232 is identically configured and, therefore, only one will be described in greater detail. However, it should be apparent that the description of one linkage assembly 232 is applicable to the other. Further, although two four-bar linkage assemblies 232 are preferred, such a mechanism 230 formed in accordance with other embodiments may include greater or fewer linkage assemblies, such as three or one four-bar linkage assemblies. Accordingly, such embodiments are also within the scope of the present invention.

The four-bar linkage assembly 232 includes an upper arm 201, a lower arm 202, a weighing link 212, and an intermediate support 217. One end of the upper and lower arms 201 and 202 is suitably connected to a luggage bin housing assembly at fixed points 206 and 207, respectively. The upper ends of the upper arms 201 are suitably connected by a torque tube 205 to maintain a coordinated movement between each end of the bin bucket 203. Lifting of bin bucket 203 is assisted by a primary actuator 204. A suitable primary actuator 204 includes any of the actuators described above or any mechanical, gas, or fluid spring and the size of the actuator 204 may be limited by the pull-down force required to open the bin bucket 203.

The upper and lower arms 201 and 202 are suitably connected to the intermediate support 217 at pivot joints 208 and 209. As may be best seen by referring to FIG. 10, the intermediate support 217 includes slots 226a and 226b. The slots 226a and 226b are suitably located adjacent connection joints 210 and 211 (FIG. 8) extending between the bin bucket 203 and the intermediate support 217. Each connection joint 210 and 211 suitably includes one of first and second roller bearings 228a and 228b, respectively, for reduced friction. The first and second roller bearings 228a and 228b are coupled to the bin bucket 203 by well known pins (not shown) and permit the bin bucket 203 to move relative to the intermediate support 217 and lower arm 202. As may be best seen by referring to FIGS. 8 and 9, the roller bearings 228a and 228b are pinned to the bin assembly 203, such that the weighing link 212 pivots about the pivot point 208, as is described in greater detail below.

The relative motion between the bin bucket 203 and the intermediate support 217 is resisted by the weighing link 212. The weighing link 212 bears against the first roller bearing 228a located at the connection point 210. The weighing link 212 is suitably attached to the intermediate support 217 at the first pivot joint 208 and to an upper end of a secondary actuator 216 at a second pivot joint 214. The lower end of the secondary actuator 216 is suitably attached to the intermediate support 217 at a third pivot joint 215.

Figure 8:
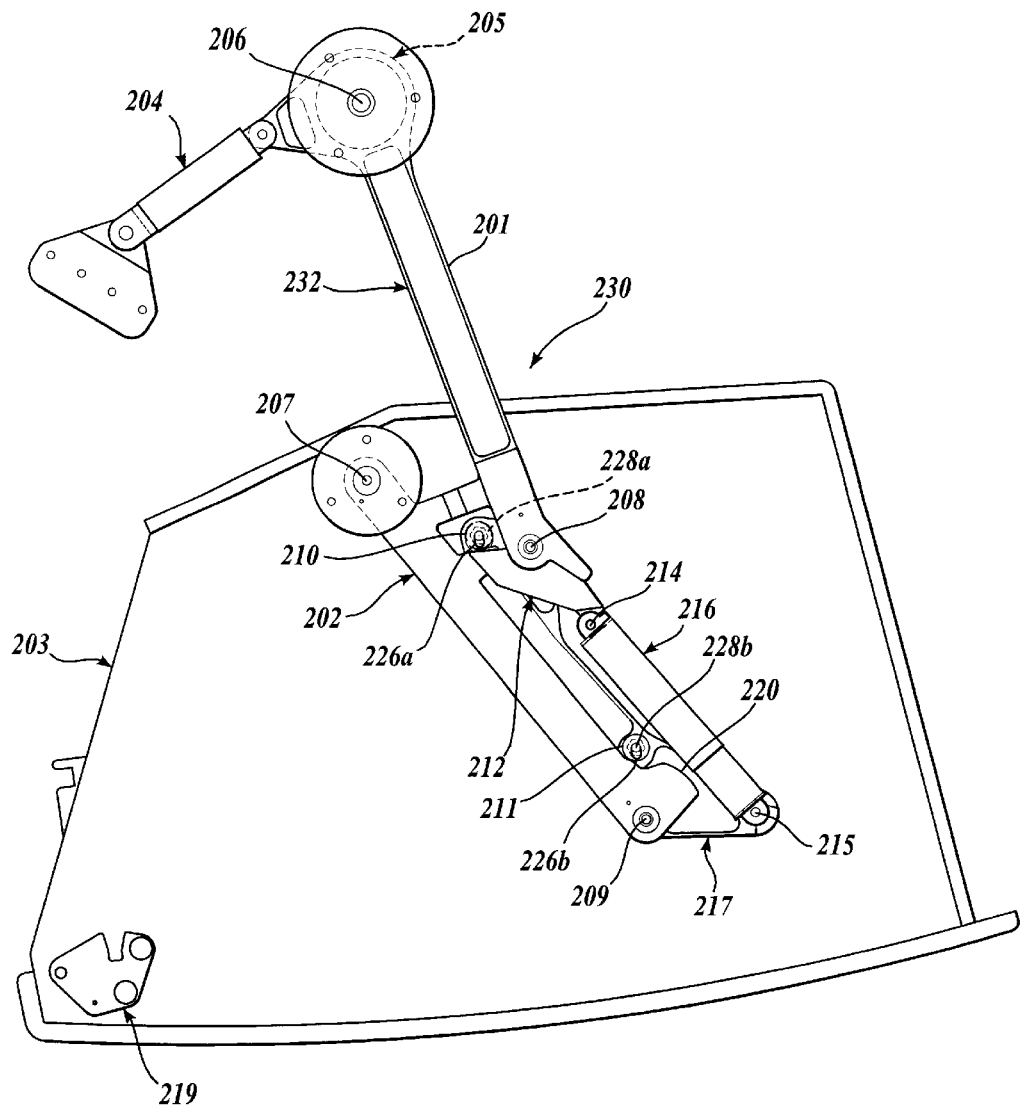
FIG. 8 is a side planar view of an overhead bin having a variable load assist mechanism formed in accordance with another embodiment of the present invention, showing the overhead bin in an open position.
Figure 9:
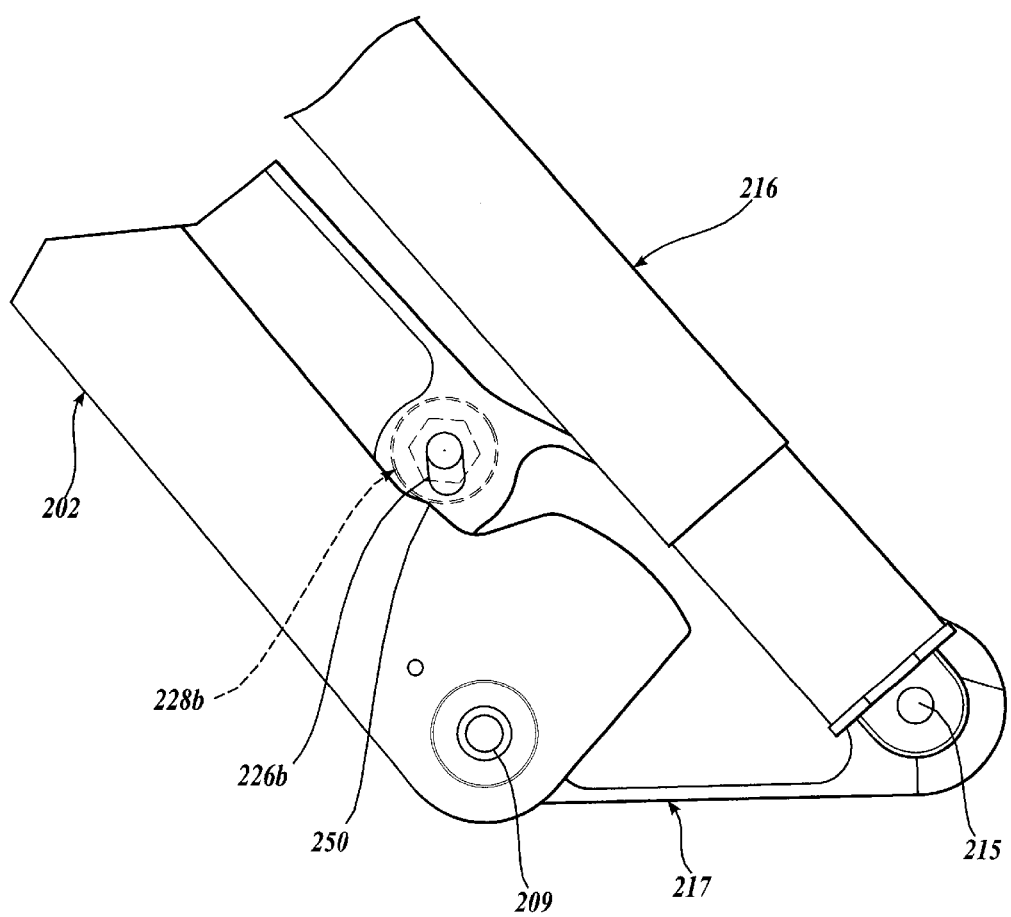
FIG. 9 is a magnified view of a portion of the variable load assist mechanism of FIG. 8.
Figure 10:
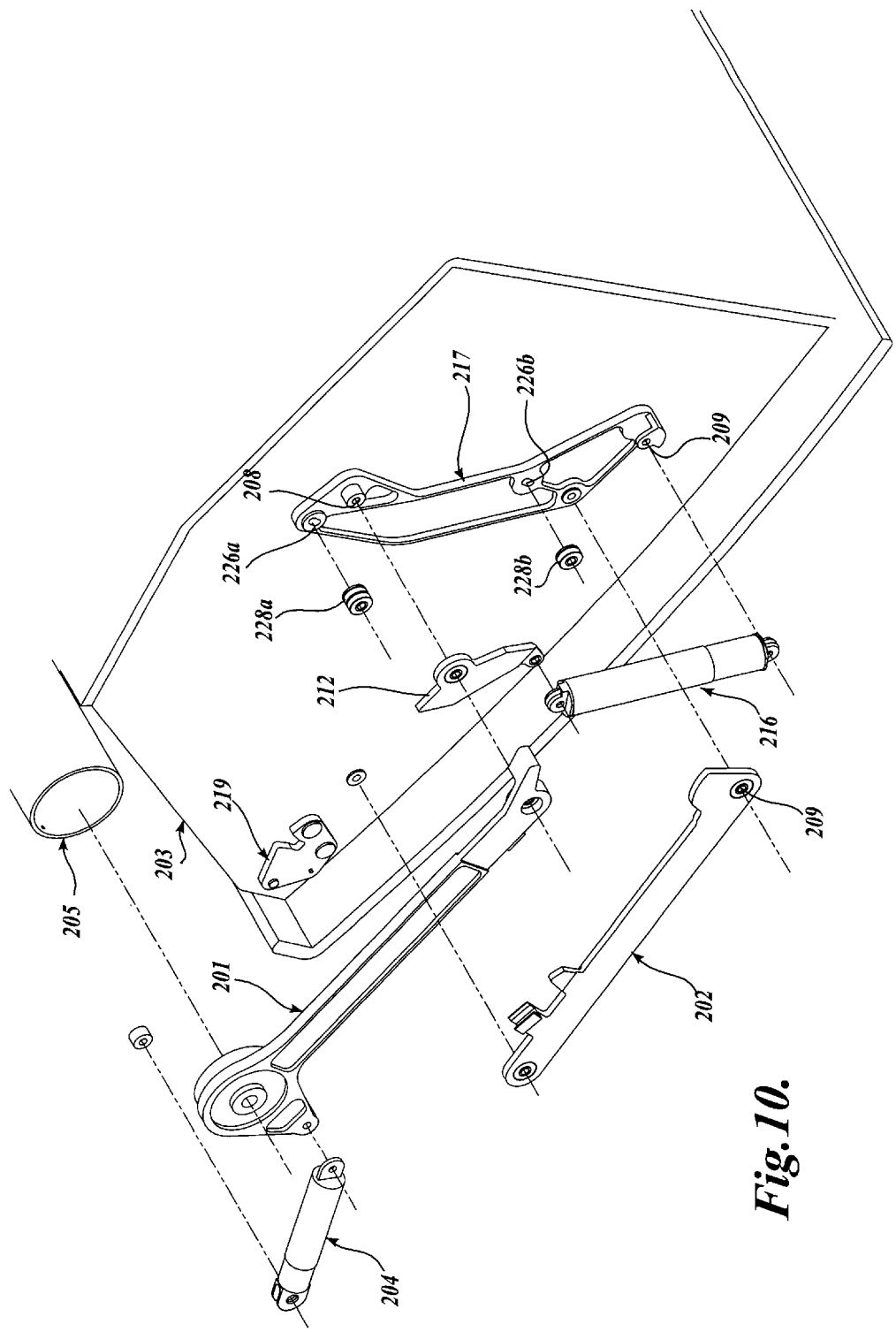
FIG. 10 is a partial exploded view of the variable load assist mechanism of FIG. 8, showing various components of the variable load assist mechanism.
Figure 11:
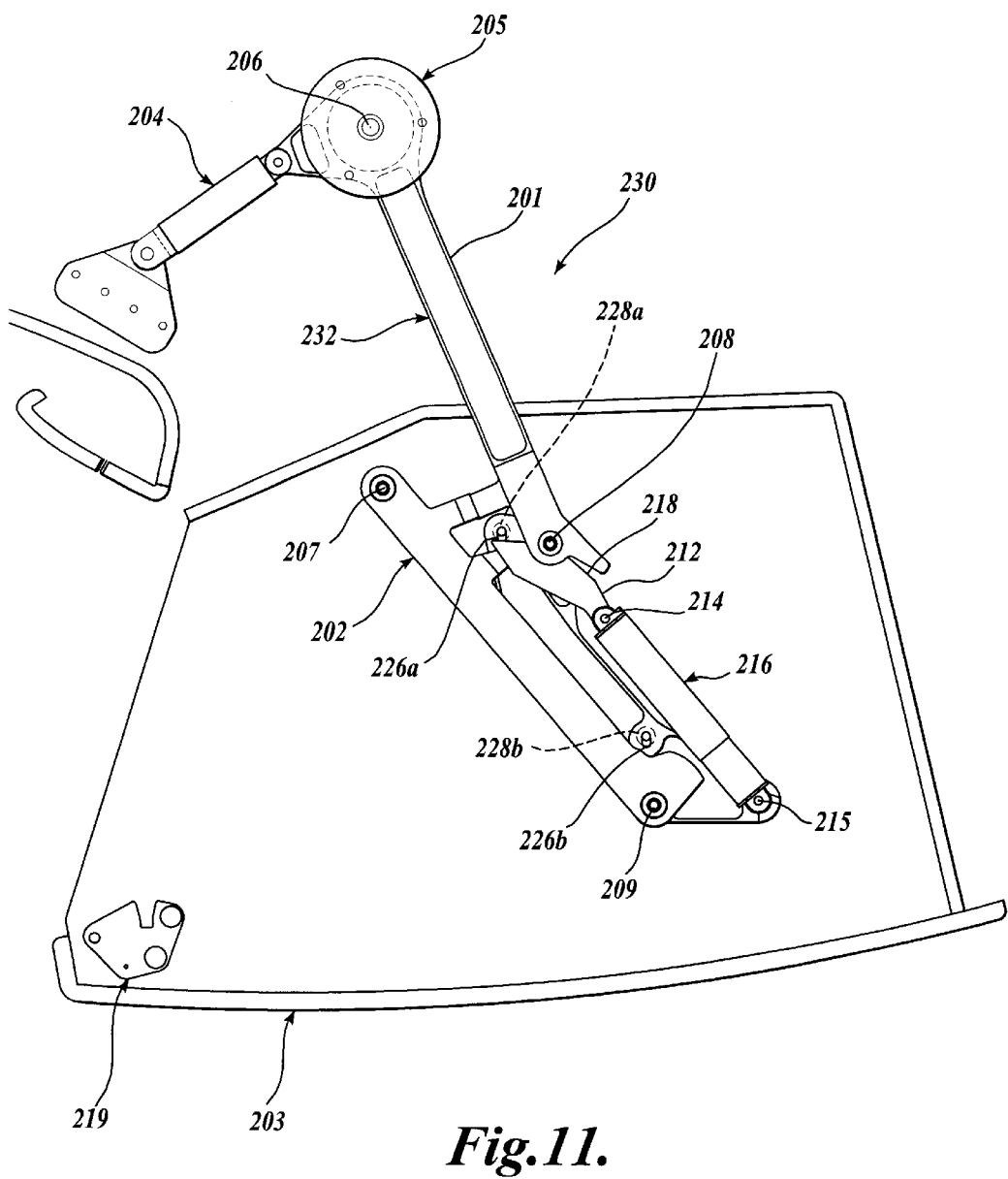
FIG. 11 is a side planar view of the overhead bin assembly of FIG. 8, showing the bin bucket rotated a predetermined amount toward the closed position, lightly loaded, and a portion of the variable load assist mechanism in a locked position.

The secondary actuator 216 is also held in the locked position when the bin bucket 203 is in the fully open position, as best seen by referring to FIG. 1. As seen in FIG. 8, the secondary actuator 216 is maintained in the locked position by the second pivot joint 214 being overcenter of the first pivot joint 208 and third pivot joint 215. By maintaining the secondary actuator 216 in the locked position, the risk of the bin bucket 213 being rapidly deployed into the closed position by the secondary actuator 216 is minimized. Thus, whenever the bin bucket 203 is displaced into the fully open position, for either loading or unloading items from within the bin bucket 203, the secondary actuator 216 is held in a locked position.

The secondary actuator 216 is any one of well known actuators, such as a gas, hydraulic, or spring actuator, and is prevented from actuating when the bin bucket 203 is lightly loaded. Specifically, and as best seen by referring to FIG. 11, when the bin bucket 203 is lightly loaded, the secondary actuator 216 is held in a locked position by the second pivot joint 214 being overcenter of the first and third pivot joints 208 and 215. In this locked position, the weighing link 212 bears against the first roller bearing 228a at the connection point 210.

Figure 12:
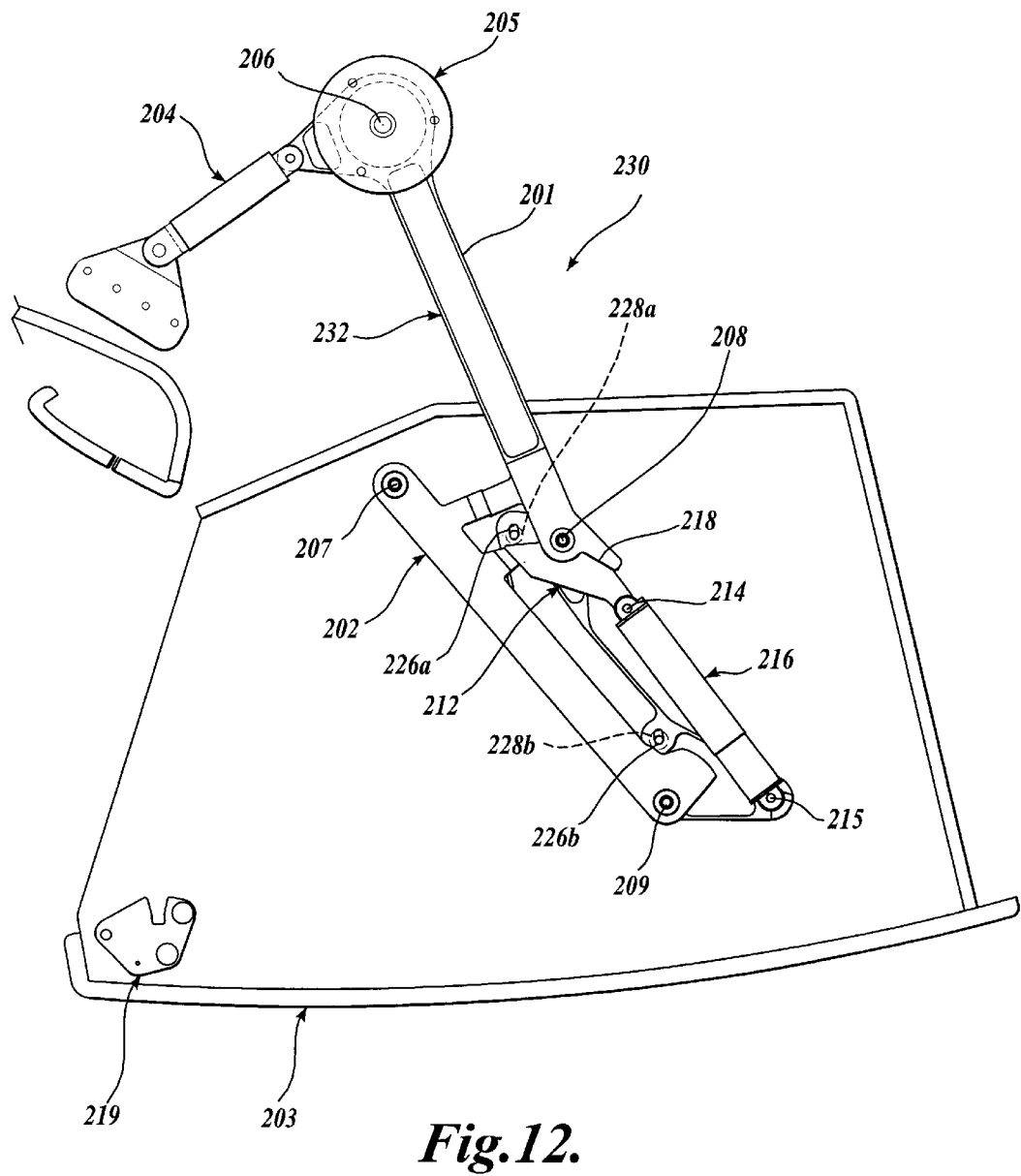
FIG. 12 is a side planar view of the overhead bin assembly of FIG. 8, showing the bin bucket rotated a predetermined amount toward the closed position, and with the bin bucket heavily loaded.

As may be best seen by referring to FIG. 12, if the bin bucket 203 is heavily loaded, the first roller bearing 228a at the connection point 210 will drive the weighing link 212 during initial opening and will also drive the secondary actuator 216 from its overcenter, locked position. The weighing link 212 will then bear on the upper arm 201 at a point 218, thereby providing additional force to lift the bin bucket 203. Specifically, as weight within the bin bucket 203 meets or exceeds a predetermined limit, the first bearing 228a slides within the slot 226a against one end of the weighing link 212. This motion causes the weighing link 212 to pivot about first pivot joint 208. The weighing link 212 continues to pivot about the first pivot joint 208 until it contacts the upper arm 201 at the bearing point 218. In this position, and as may be best seen by referring to FIG. 12, the secondary actuator applies an assist load to the mechanism 230 during reciprocation of the bin bucket 203 between the extended and retracted positions.

Actuation of the secondary actuator 216 is triggered when weight within the bin bucket 203 exceeds a predetermined limit and is moved from the fully extended or retracted position. As a nonlimiting example, the secondary actuator 216 is actuated when the bin bucket 203 has been rotated approximately ten (10) degrees from the fully extended position toward the retracted position. Although it is preferred that the secondary actuator 216 assist in both opening and closing of the bin bucket 203, other types of actuators, such as one that assists only in closing or opening the bin bucket 203, are also within the scope of the present invention.

As noted above, actuation of the secondary actuator 216 is triggered when a weight disposed within the bin bucket 203 exceeds a predetermined limit. Within the meaning of this disclosure, a "predetermined weight limit" can vary according to the size and type of bin bucket. Accordingly, the magnitude of the weight limit will vary and is dependent upon various factors, including the type of vehicle in which the bin assembly is mounted, the type of materials disposed within the bin bucket, and related considerations. As a nonlimiting example, for a bin bucket disposed within the fuselage of an aircraft, the predetermined weight limit that must be exceeded before the secondary actuator 216 is actuated is ten (10) pounds. Although ten (10) pounds is cited as a nonlimiting example, it should be apparent that a lesser or greater weight limit is also within the scope of the present invention.

Also within the meaning of this disclosure, a "predetermined weight limit" can vary according to the size of the actuator 216 and the geometry of the linkage 232. As a nonlimiting example, the predetermined weight limit may be increased or decreased according to the overcenter lock geometry of the actuator 216 relative to the pivot joints 208, 214, and 215, as well as to the force exerted by the actuator 216. In that regard, the predetermined weight limit required to trigger the actuator 216 may be increased by displacing the second pivot joint 214 in a clockwise direction (FIG. 8) about the first pivot joint 208.

Figure 13:
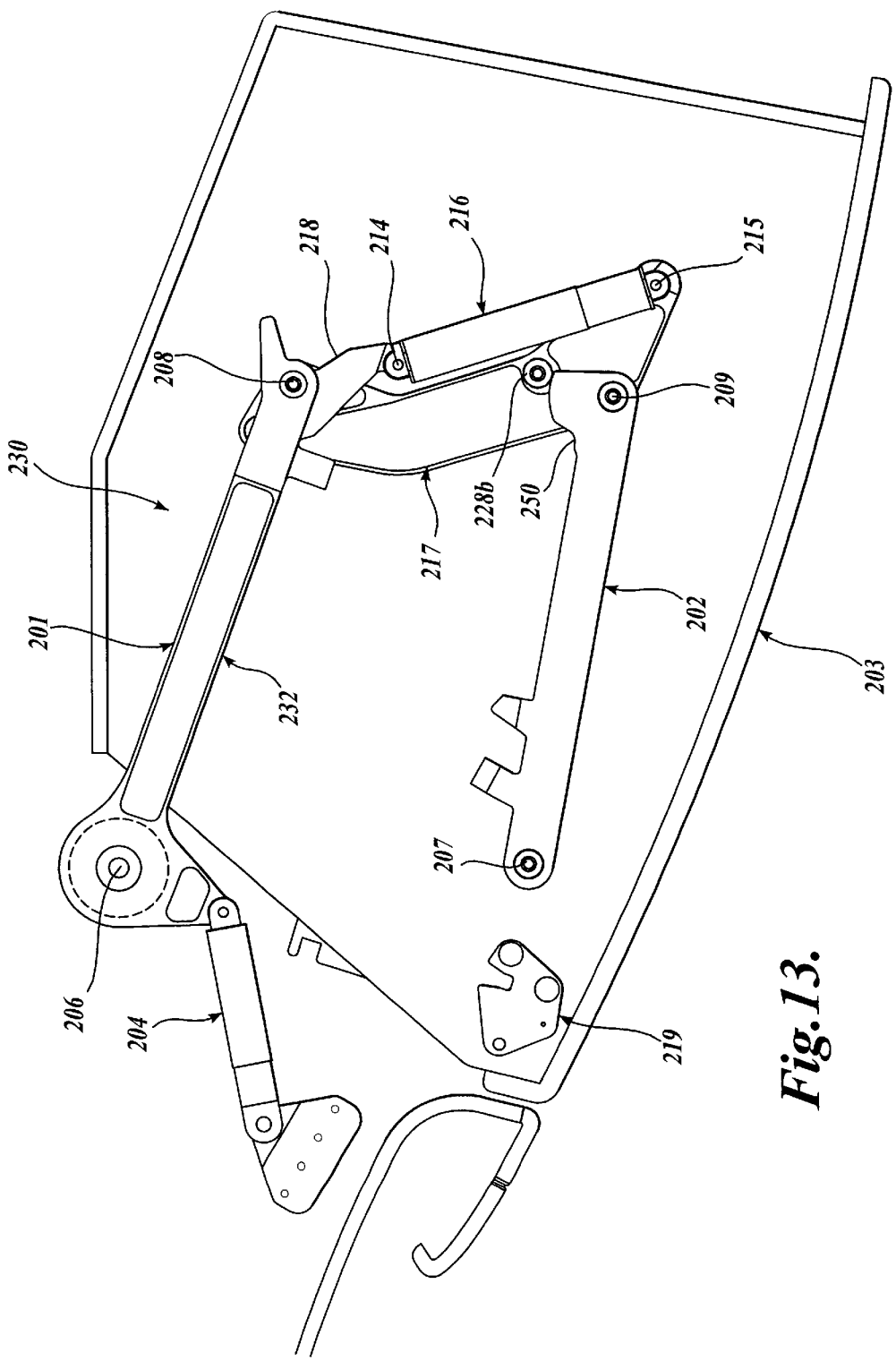
FIG. 13 is a side planar view of the overhead bin assembly of FIG. 8, showing the overhead bin assembly in the closed position and lightly loaded.

Positioning of the secondary actuator 216 when the bin bucket 203 is in the closed position and lightly weighted is best seen by referring to FIG. 13. In this position, the secondary actuator 216 is in the locked position and will not apply a resistance force to the bin bucket 203 when the bin bucket 203 is opened. Positioning of the secondary actuator 216 when the bin bucket 203 is in the closed position and heavily loaded is best seen by referring to FIG. 14. In this position, the secondary actuator 216 is in the unlocked position and will apply a resistance force to the bin bucket 203 when the bin bucket 203 is opened.

During closing, a cam 250 bears on the second roller bearing 228b at the connection point 211. The cam 250 locks the bin bucket 203 into a nominal position of a lightly loaded bin bucket so as to maintain the bin bucket 203 in the open position regardless of whether the bin bucket 203 is lightly or heavily loaded. Upon beginning of the closing process, the bearing 228b is permitted to move within the slot 226b by the relative rolling motion of the bearing 228b over the cam 250. The bin bucket 203 is suitably maintained in the closed position by a well known latch 219.

During subsequent opening, the secondary actuator 216 will be returned to the overcentered position by the action of the upper arm 201 bearing on contact point 218.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A luggage bin assembly, comprising:
   (a) a luggage bin mounted for reciprocating movement between an extended position and a retracted position in response to a reciprocating load;
   (b) a linkage assembly mounted to the luggage bin for swinging movement with the luggage bin as the luggage bin is reciprocated between the extended and retracted positions; and
   (c) an actuator coupled to the linkage assembly for selectively applying an assist load to the linkage assembly when weight disposed within the luggage bin exceeds a predetermined limit.

2. The luggage bin assembly of claim 1, wherein the actuator is displaced into a locked position when the weight disposed within the luggage bin is below the predetermined limit.

3. The luggage bin assembly of claim 1, wherein the assist load is continually applied as the bin assembly is reciprocated between the extended and retracted positions to reduce the reciprocating load.

4. The luggage bin assembly of claim 3, wherein the linkage assembly includes an upper and lower arm assembly, wherein the actuator extends between the upper and lower arm assemblies.

5. The luggage bin assembly of claim 4, wherein the lower arm assembly includes a cammed surface to assist in maintaining the luggage bin in the extended position during loading and unloading of the luggage bin.

6. A luggage bin assembly adapted to be disposed within a vehicle, the luggage bin assembly comprising:
(a) a bin assembly reciprocally mounted for reciprocating movement between opened and closed positions;
(b) upper and lower arm assemblies pivotably connected to the bin assembly, at least one of the upper and lower arm assemblies having a cammed surface to assist in maintaining the bin assembly in the opened position; and
(c) an actuator extending between the upper and lower arm assemblies to selectively assist in reciprocating the bin assembly between the opened and closed positions by applying an assist load to the bin assembly when the bin assembly is reciprocated between the opened and closed positions wherein the actuator applies the assist load in response to a predetermined load being disposed within the bin assembly.

7. The luggage bin assembly of claim 6, wherein the actuator selectively applies the assist load to the upper and lower arm assemblies.

8. The luggage bin assembly of claim 6, wherein the actuator is maintained in a locked position when weight in the bin assembly is below a predetermined limit.

9. A luggage bin assembly adapted to be disposed within a vehicle, the luggage bin assembly comprising:
(a) a bin swingingly coupled for reciprocating movement between an opened position, where a weight may be disposed within the bin, and a closed position;
(b) attachment means connected to the bin for reciprocating the bin between the opened and closed positions; and
(c) means for applying an assist force to the attachment means, the means for applying an assist force being coupled to the attachment means and actuatable to selectively apply the assist force to the attachment means when the weight in the bin exceeds a predetermined limit.

10. The luggage bin assembly of claim 9, wherein means for applying an assist force to the attachment means is an actuator.

* * * * *